United States Patent
Larsson et al.

(10) Patent No.: US 8,200,210 B2
(45) Date of Patent: Jun. 12, 2012

(54) METHOD FOR CLASSIFYING RADIO CHANNELS

(75) Inventors: Kjell Larsson, Lulea (SE); Markus Andersson, Boden (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 22 days.

(21) Appl. No.: 12/522,624

(22) PCT Filed: Jan. 10, 2007

(86) PCT No.: PCT/SE2007/050007
§ 371 (c)(1),
(2), (4) Date: Jul. 9, 2009

(87) PCT Pub. No.: WO2008/085093
PCT Pub. Date: Jul. 17, 2008

(65) Prior Publication Data
US 2010/0081426 A1   Apr. 1, 2010

(51) Int. Cl.
*H04W 24/00* (2009.01)
(52) U.S. Cl. ..... 455/423; 455/446; 455/447; 455/67.11; 455/67.13; 455/67.16
(58) Field of Classification Search ............ 455/423, 455/266, 450, 422, 447, 446, 524, 67.11–67.16; 375/224, 144; 370/423, 241, 208, 503, 203, 370/260
See application file for complete search history.

(56) References Cited

U.S. PATENT DOCUMENTS

| | | | | |
|---|---|---|---|---|
| 5,475,868 A * | 12/1995 | Duque-Anton et al. | ........ | 455/62 |
| 6,078,815 A * | 6/2000 | Edwards | ........ | 455/450 |
| 6,606,719 B1 * | 8/2003 | Ryckebusch et al. | ........ | 714/712 |
| 6,700,538 B1 * | 3/2004 | Richards | ........ | 342/458 |
| 6,990,142 B2 * | 1/2006 | Chappaz | ........ | 375/224 |
| 7,675,844 B2 * | 3/2010 | McCoy | ........ | 370/208 |
| 2003/0043887 A1 * | 3/2003 | Hudson | ........ | 375/144 |
| 2006/0135149 A1 * | 6/2006 | Fullerton et al. | ........ | 455/423 |
| 2007/0177680 A1 * | 8/2007 | Green et al. | ........ | 375/260 |

OTHER PUBLICATIONS

3RD Generation Partnership Project. "3GPP TR 25.943 V6.0.0 (Dec. 2004)." 3rd Generation Partnership Project; Technical Specification Group Radio Access Networks; Deployment aspects (Release 6). Dec. 2004.
Toeltsch, M. et al. "Statistical Characterization of Urban Spatial Radio Channels." IEEE Journal on Selected Areas in Communications, vol. 20, No. 3, Apr. 2002, pp. 539-549.
Abdi, A. et al. "On the Estimation of the K Parameter for the Rice Fading Distribution." IEEE Communications Letters, vol. 5, No. 3, Mar. 2001, pp. 92-94.

* cited by examiner

*Primary Examiner* — Charles Appiah
*Assistant Examiner* — Michael Vu
(74) *Attorney, Agent, or Firm* — Coats & Bennett, P.L.L.C.

(57) ABSTRACT

In a method and device, simple hardware such as a standard User Equipment (UE), a mobile telephone, is used to collect the impulse response of a radio channel. The data generated is used to classify radio channels based on the impulse response estimates by estimating distribution parameters of the impulse response. This makes it possible to distinguish between different types of fading and hence, radio environments by matching the parameters to known radio channel models.

16 Claims, 3 Drawing Sheets

METHOD FOR CLASSIFYING RADIO CHANNELS

TECHNICAL FIELD

The present invention relates to a method and a device for measuring and determining radio channel characteristics.

BACKGROUND

Radio channel measurement is a widely investigated research area. The research has aimed at the development of channel models such as Typical Urban, Rural Area etc. Each such model describes the characteristics various channel environments have and which may be very different from each other indeed. Such models of real measurements can i.a. be utilized as an input parameter in the planning of a radio cell structure.

The differences in the radio environments come from the physical properties of the channel. As propagating radio waves are reflected, diffracted and scattered depending on the dimension and surface properties of the obstacles they encounter, various environments will affect a transmitted signal differently. The effects of reflection and scattering will lead to a multi-path propagation of each sent signal, i.e. each sent signal will be split in numerous rays which all travel on their own path to the receiver. Since these paths will have unequal distance, the received signal will be dispersed in time. This is commonly referred to time dispersion. Different environments will introduce various amount of time dispersion. Hence, a sparsely built rural area will lead to less time dispersion than a densely built urban environment.

A signal sent from a transceiver at some time will start to arrive at the receiver at, say time $t_0$. From that point on, the received energy will be the sum of all incoming rays as a function of the excess time $\tau$. The amount of time dispersion that the channel induces affects the time it takes before the received energy fades away. The power delay profile of a channel displays the received energy as a function of excess time. Using the power delay profile computation of mean excess delay, and root mean square (rms) delay spread can be performed. Mean excess delay is a measurement of the extra delay that the channel introduces after the first part of the signal arrives at $t_0$. Delay spread is the standard deviation of the delayed reflections, weighted by their respective energy. Both mean excess delay and delay spread differs widely between channel types which makes them important channel characteristics.

The instantaneous received power is the sum of many rays arriving with different amplitude and phase. Hence, a moving antenna will experience a strong signal where the superposition of the rays is constructive and, unfortunately, a very weak signal if it's destructive. These variations in time are usually referred to as fading.

The Rayleigh model assumes that a received multi-path signal can be considered consisting of a large number of waves, possibly infinitely many, with independent and identically distributed, (i.i.d.) in-phase and quadrature components. The central limit theorem supports, that with sufficiently many arriving waves the IQ components will be Gaussian distributed.

If z=x+iy, where x and y are i.i.d Gaussian distributed with zero mean and variance $\sigma^2$, the probability density function, PDF, for the received amplitude, |z|, becomes $$f(x\mid\sigma) = \frac{x}{\sigma^2}\exp\left(-\frac{x^2}{2\sigma^2}\right)$$

which is the Rayleigh distribution. It is well known that the Rayleigh model is in fact suitable for describing how the amplitude of the received signal fades in areas with lots of scattered waves, such as densely built cities.

Radio waves propagating in sparsely built cities or rural areas are, just like those in densely areas, scattered and reflected. The big difference is that, in contrast to radio waves in a densely built city, usually a line-of-sight (LOS) wave reaches the receiver. Since this wave often is strong compared to the scattered waves, the PDF of the amplitude will change. The scattered waves will no longer have zero mean.

Due to this shift in mean, the amplitude PDF will change form. This new form is the Rician distribution defined as $$f(x\mid s,\sigma) = \frac{x}{\sigma^2}\exp\left(-\frac{(x^2+s^2)}{2\sigma^2}\right)I_0\left(\frac{xs}{\sigma^2}\right)\ x > 0$$

where the non-centrality parameter s>0 and the scale parameter $\sigma$>0. $I_0$ is the zero-order modified Bessel function of the first kind. The Rician K-factor which is defined as $$K = \frac{s^2}{2\sigma^2}$$

express the ratio of direct wave component to the scattered waves. The stronger the line-of-sight component is, the greater will be the shift of mean be for the scattered waves. Such a shift will make the Rician distribution approach Gaussian distribution. As the direct wave part weakens the shift of mean will approach zero and the Rician PDF becomes equal to the Rayleigh PDF.

Existing measurement devices for determining radio channel characteristics are very complex and expensive. This equipment typically requires certain types of radio signals and is typically developed with the aim to generate radio channel models. For example existing measurement devices usually employ a specific transmitter and receiver.

Furthermore, when planning a radio system for an area it is important to have knowledge about the radio channel characteristics for the different parts of the area in order to optimize the radio system performance. Hence, for each cell it is important to know which radio channel model, such as Typical Urban, Rural Area, etc to employ as input in the cell planning tool.

A visual observation can give a hint of the environment type, i.e. if the measurements are performed in a city or in a rural area. However, even if two areas look to be very similar, the radio wave propagation properties can differ significantly. This will therefore result in that radio cells are designed using an incorrect radio channel model which in turn results in a degraded performance compared to if the true radio channel characteristics had been employed.

In order to avoid problems resulting from application of an incorrect radio channel model in cell planning it is hence desired to have a true picture of the radio channel characteristics at hand. Also, without information relating to the radio environment it can be hard to explain differences between obtained results or to select the correct radio channel model for a particular area. Furthermore the radio channel information should preferably be provided rapidly and be inexpensive to generate.

SUMMARY

It is an object of the present invention to overcome or at least reduce some of the problems associated with existing approaches for determining radio channel characteristics.

It is another object of the present invention to provide a tool that can be used as a data collecting tool for use as input data with regard to choice of radio channel model in radio cell planning and in a diagnosis instrument when combating problems in existing radio systems.

It is yet another object of the present invention to provide a radio channel classification tool that is inexpensive to manufacture and which has low maintenance costs.

It is yet another object of the present invention to provide a tool that can provide rapid output and which enables real-time radio channel classification even when the user moves at high speed.

These objects and others are obtained by the method and device as set out in the appended claims. Thus, by using simple hardware, preferably including a standard User Equipment (UE), such as a mobile telephone, to collect the impulse response of the channel, the classification of channels can be performed from the impulse response estimates. This can for example be performed by estimating the distribution (PDF) parameters.

This makes it possible to distinguish between different types of fading and hence, radio environments by matching e.g. the collected PDF parameters to known radio channel models. Together with the time dispersion, conclusions can be drawn about the perceived channel environment and which radio channel model that best matches the collected data. For example the channels can be classified according, but not limited to, the ITU channel models.

Also, even when the entire radio environment isn't classified with the distribution type of each received ray and the delay spread, the distribution K-factor is a key parameter by it self.

BRIEF DESCRIPTION OF THE DRAWINGS

The present invention will now be described in more detail by way of non-limiting examples and with reference to the accompanying drawings, in which.

DETAILED DESCRIPTION

Figure 1:
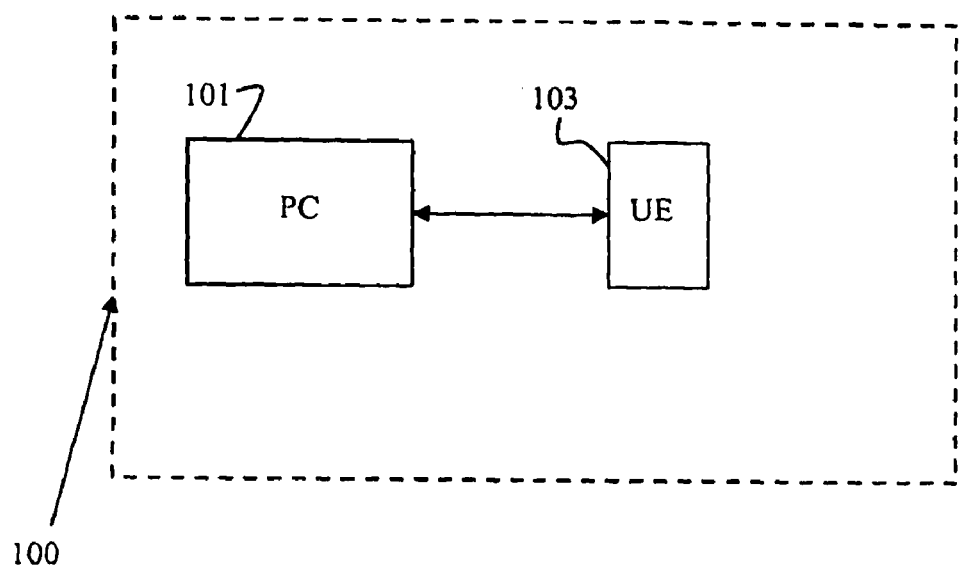
FIG. 1 is a view of an arrangement used for collecting and displaying data related to radio channel classification and determination.

In FIG. 1, a general view of an arrangement 100 used for radio channel classification and radio channel measurements is shown. The arrangement 100 comprises a unit 103 for sending and receiving radio signals over a cellular radio network. The unit 103 can typically and advantageously be a conventional mobile telephone or any other user equipment (UE) adapted to communicate with a personal computer PC 101. It is also envisaged that the unit 103 is integrated in the PC 101.

The unit 103 is adapted to send and receive signals in a cellular radio network and to forward data to the PC 101 for processing by the PC 101. The unit 103 is further adapted to receive control signals from the PC 101 and to generate signals in the radio network in response to such control signals. The PC 101 is adapted to control the unit 103 and process any data generated in response to such control signals. The output from the PC 101 can typically be data for use in a radio cell planning or a visualization of the radio channel characteristics in a particular area that could be used for diagnosis and error detection/correction. This will be described more in detail below in conjunction with FIG. 2.

Figure 2:
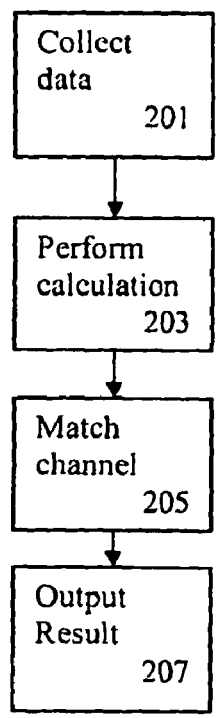
FIG. 2 is a flow chart illustrating some basic steps performed when classifying radio channels.

In FIG. 2 steps performed by the arrangement shown in FIG. 1 when classifying a radio channel are illustrated. Classification of a radio channel is based on data from the unit 103 or other suitable hardware and is executed in a number of steps. First, in a step 201, recording of data is performed using a UE. The channel estimation related parameters can be logged by the use of a logging tool, which can be located inside or outside the UE. The data recorded can typically be un-scaled measurements of the impulse response of the physical channel or data that can be used to derive such data. For example, but not limited to, known symbol sequences such as the rotated CPICH symbols, the Automatic Gain Control (AGC) i.e., the amount of intensification the hardware applies on the received signal or the Finger delay, i.e. the delay between each tap in the estimated impulse response, can be used. CPICH is the common pilot channel, one of the channels used for transmission of pilot symbols which is used in UMTS and other CDMA radio systems.

Next the data obtained in step 201 is processed. The channel estimates which are calculated by the use of known symbol sequences can be extracted both scaled and un-scaled. Regardless the type of estimates used, distribution estimation is possible with different pre-processing of the data. Such pre-processing can for example include scaling with the automatic gain control, finger interference or symbol variance.

Parameter estimation of pre-processed samples can be done using numerous techniques. Examples of such techniques are maximum likelihood estimation and method of moments. Method of moments makes use of the moments of the PDF which often give simple expressions for the parameters. In maximum likelihood estimation the likelihood function of observing the given data set is maximized. Detailed information about estimation techniques can be found in Abdi, A.; Tepedelenlioglu, C.; Kaveh, M.; Giannakis, G. (2001). On the estimation of the K parameter for the Rice fading distribution. IEEE Communications Letters. Volume: 5. Issue: 3. Page: 92-94; Kay, Steven M. (1993). Fundamentals of Statistical Signal Processing: Estimation Theory. Prentice Hall PTR. Upper Saddle River, N.J. 07458. ISBN 0-13-345711-7. Chapter 7 & 9 and Talukdar, Kushal K.; Lawing, William D. (1991). Estimation of the parameters of the Rice distribution. The Journal of the Acoustical Society of America. Volume: 89. Issue 3. Page: 1193-1197.

As the theory behind radio wave propagation reflects in the type of fading each channel induces, the estimated distribution (PDF) parameters gives important information about the received signal composition. By calculating the Rician K-factor using the estimated parameters a comparison can be made between the calculated K-factor and the theoretical K-factor specified in for instance the ITU channel models, see 3GPP. (2002). Technical Specification Group Radio Access Networks; Deployment aspects Release: 5. TR 25.943 v 5.1.0.13.

These models also have the time indexes for the impulse responses' taps specified. This makes it possible to make comparisons of the mean excess delay and delay spread between the theoretical model and the recorded data.

One definition of mean excess delay and delay spread can be expressed as:

$$\bar{\tau} = \frac{\sum_k a_k^2 \tau_k}{\sum_k a_k^2} = \frac{\sum_k P(\tau_k)\tau_k}{\sum_k P(\tau_k)}$$

$$\overline{\tau^2} = \frac{\sum_k a_k^2 \tau_k^2}{\sum_k a_k^2} = \frac{\sum_k P(\tau_k)\tau_k^2}{\sum_k P(\tau_k)}$$

$$\sigma_\tau = \sqrt{\overline{\tau^2} - (\bar{\tau})^2}$$

where $a_k$ is the amplitude, $P(\tau_k)$ is the power and $\tau_k$ is the time index of the impulse responses' taps. Using any such suitable model and suitable reference models the processed data is matched to a model best describing the current conditions. This takes place in a step 205.

Finally, in a step 207, the result of the matching is output in a format adapted for the intended use. For example, if the use is cell planning the output could be written to a memory of the PC 101 or the output could be displayed on a screen to reflect the channel characteristics at a particular location or area.

Figure 4:
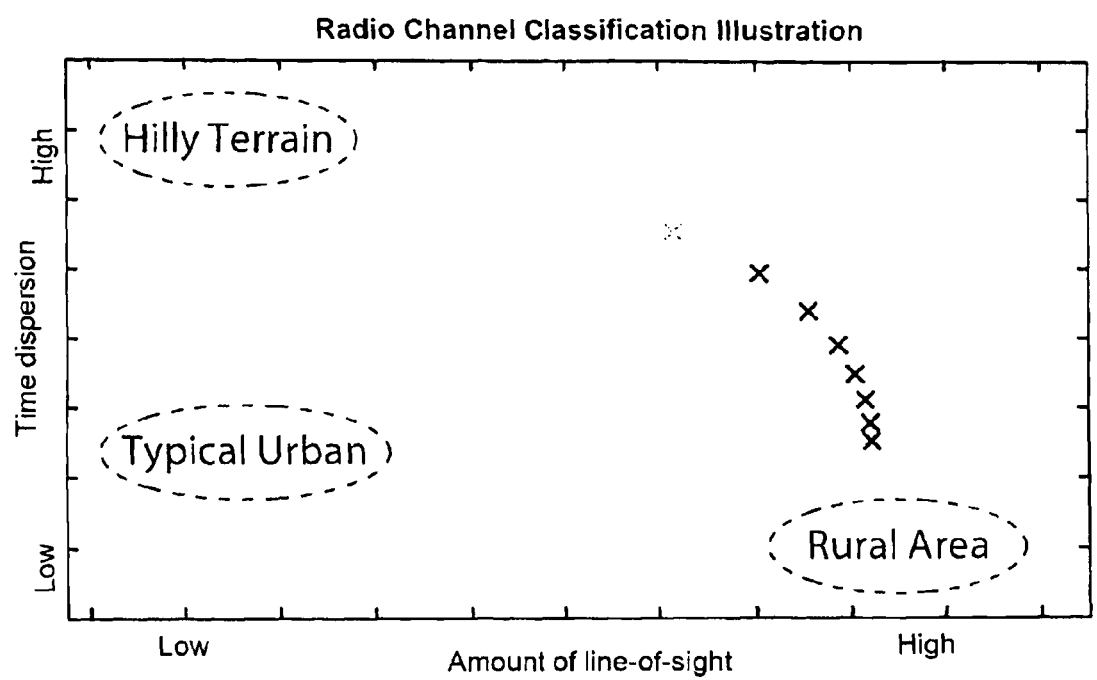
FIG. 4 is an example of graphical visualization of the results

Due to the, most likely, rapid changes in the radio channel environment, the results from the estimation and time dispersion calculations will vary in time. Low-pass filtering will make it easier to present the results which could be done using a two dimensional figure as shown in FIG. 4.

For example a pointer placement can be made to represent the amount of line-of-sight and the delay spread after filtering. As it changes in time, a buffer is used to display older samples. These are faded as the pointer position is updated and the radio channel changes. The regions where the combination of delay spread and K-factor correspond to known channel models can for example be shown either by simple ellipses or by a color gradient background which intuitively show a smooth transition between various channel models. To exemplify, during a test drive performed for an area where one expects a certain channel model, such a graphical visualization will quickly show if the perceived channel correspond to the expected one.

Figure 3:
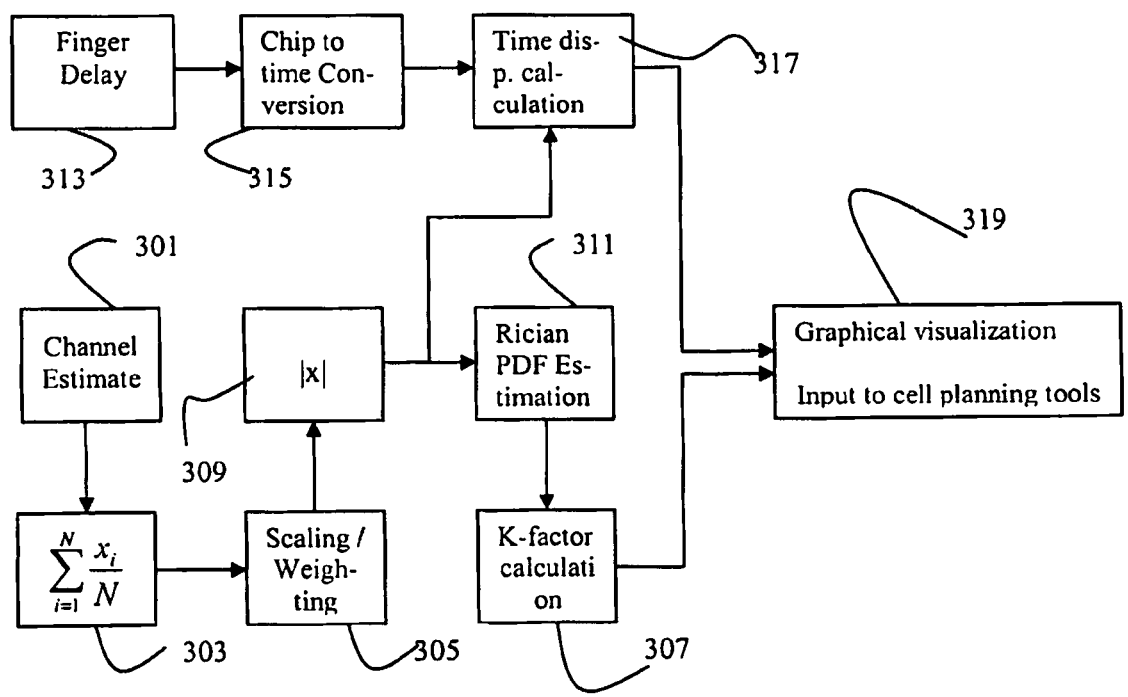
FIG. 3 is a schematic view illustrating some steps performed in the arrangement as depicted in FIG. 1.

In FIG. 3 some exemplary processing steps in accordance with the radio channel classification procedure as described herein is described more closely. Thus channel estimates in one slot are collected in a process step 301. The collected estimates are averaged in a process step 303. In a further process step 305 the averaged estimates are scaled and weighted to get accurate data. This can be done in various ways, e.g. with AGC, and/or the variance of the channel estimates. Next in process step 309 the output from step 305 is expressed as an absolute value to represent the amplitude. Thereupon Rician PDF parameter estimation is performed in a process step 311. The estimation process in step 311 can be performed using numerous different techniques such as maximum likelihood and method of moments. Finally, in a step 307, the Rician K-factor can be calculated with the result from the estimation.

In parallel with the processing steps 301-311, the time between the fingers in the Rake receiver, finger delay, which is in chips, is converted to time in process steps 313 and 315. Together with the amplitude of the channel estimates, the mean excess delay and delay spread are calculated in a step 317.

The output results from steps 311 and 317 are then presented in a suitable format as described above. That is for example as a visual imaging of the radio channel characteristics and/or as absolute numbers. Such data can be used as input to cell planning tools together with location of measurements (GPS) etc.

Using the method and device as described herein will provide a test tool that is cheap to manufacture because it can use standard test mobile station. It requires no additional equipment from what's normally used during field tests. The method and device as described herein will further provide output results that have a performance that is sufficient in classifying the radio channel. The measurement data calculated is easy to use and can advantageously be based on, but not necessary limited to, ITU standard channel types.

The invention claimed is:

1. An apparatus for classifying radio channels in a cellular radio system characterized by:
    a receiver for receiving a signal in the cellular radio system, said signal received through a radio channel; and
    a computer associated with the receiver and configured to classify the radio channel by matching received signal characteristics determined from a channel impulse response measured for the received signal to a stored set of radio channel models comprising International Telecommunication Union (ITU) models or a subset thereof, and thereby determine which radio channel model in the set best corresponds to the received signal characteristics.

2. The apparatus of claim 1, wherein the apparatus includes a wireless unit that includes the receiver, and wherein the wireless unit is communicatively coupled to the computer and is configured to estimate the channel impulse response for the received signal.

3. The apparatus of claim 2, wherein the wireless unit further includes a transmitter that is configured to transmit a continuous signal in the cellular radio system.

4. The apparatus of claim 1, wherein the apparatus includes a mobile telephone which includes the receiver, and wherein the mobile telephone is communicatively coupled to the computer.

5. The apparatus of claim 1, wherein the apparatus includes a wireless unit that includes the receiver and is configured to process the received signal into data representing known symbol sequences, for estimating the channel impulse response.

6. The apparatus of claim 1, wherein the stored set of radio channel models corresponds to the ITU radio channel models or said subset thereof.

7. The apparatus of claim 1, wherein the computer includes or is associated with a display screen, and is configured to output a signal for visualizing the radio channel.

8. The apparatus of claim 1, wherein the computer is configured to generate the received signal characteristics at least in part as distribution parameters for the channel impulse response estimate, and to classify the radio channel based on the distribution parameters.

9. A method for classifying radio channels in a cellular radio system, the method comprising:
    receiving a signal in the cellular radio system, said signal received through a radio channel;
    measuring a channel impulse response from the received signal; storing characteristic parameters for a set of radio channel models comprising International Telecommunication Union (ITU) models or a subset thereof; matching received signal characteristics determined from the channel impulse response to the set of radio channel models; and determining which radio channel model in the set best corresponds to the received signal characteristics and classifying the radio channel accordingly.

10. The method according to claim 9, wherein receiving the signal comprises receiving the signal in a wireless unit.

11. The method according to claim 10, further comprising transmitting a continuous signal in the cellular radio system from a transmitter included in the wireless unit.

12. The method according to claim 9, further comprising processing the received signal into data representing known symbol sequences, for estimating the channel impulse response.

13. The method according to claim 9, wherein storing the characteristic parameters for the set of radio channel models comprises storing characteristic parameters corresponding to the ITU radio channel models said subset thereof.

14. The method according to claim 9, further comprising outputting a visual representation of the radio channel on a display screen.

15. The method according to claim 9, further comprising generating the received signal characteristics at least in part as distribution parameters determined from the channel impulse response.

16. A method of classifying a radio channel comprising:

receiving a signal from a cellular radio system at a mobile terminal, said signal received through the radio channel; and passing channel estimation data generated by the mobile terminal for the received signal to a computer communicatively coupled to the mobile terminal, and, in the computer:

estimating characteristic parameters for the radio channel from the channel estimation data; and classifying the radio channel by comparing the characteristic parameters estimated for the radio channel to characteristic parameters for a stored set of radio channel models comprising International Telecommunication Union (ITU) models or a subset thereof.

* * * * *

UNITED STATES PATENT AND TRADEMARK OFFICE
CERTIFICATE OF CORRECTION

PATENT NO. : 8,200,210 B2  
APPLICATION NO. : 12/522624  
DATED : June 12, 2012  
INVENTOR(S) : Larsson et al.

Page 1 of 1

It is certified that error appears in the above-identified patent and that said Letters Patent is hereby corrected as shown below:

On the Face Page, in Field (75), under "Inventors", in Column 1, Line 1, delete "Lulea" and insert -- Luleå --, therefor.

In Column 7, Line 19, in Claim 13, delete "models" and insert -- models or --, therefor.

Signed and Sealed this  
Twentieth Day of November, 2012

David J. Kappos  
*Director of the United States Patent and Trademark Office*